United States Patent
Strizhenko et al.

[11] 3,762,278
[45] Oct. 2, 1973

[54] PULSE PISTON DRIVE

[76] Inventors: Vitaly Evgenievich Strizhenko, ulitsa Osnovyanskaya 56; Igor Pavlovich Komnatny, ulitsa Cheljuskintsev, 6, kv. 1; Sergei Vasilievich Yatsenko, prospekt Moskovsky 204/1, kv. 36; Vadim Grigorievich Kononenko, ulitsa Chkalova, 15, kv. 12; Stanislav Anisimovich Maznichenko, ulitsa Kharkovskikh divizy, 18, kv. 9; Viktor Alexeevich Stelmakh, ulitsa Kirova, 18, kv. 2; Serafim Vasilievich Schekochikhin, 1 Lesoparkovsky pereulok, 5, kv. 76, all of Kharkov, U.S.S.R.

[22] Filed: Oct. 29, 1971

[21] Appl. No.: 193,650

[52] U.S. Cl. .......... 91/468, 60/26.1, 60/39.6, 251/54
[51] Int. Cl. .......... F15b 11/08, F15b 13/042
[58] Field of Search .......... 91/5, 468, 432, 446; 137/509, 155, 528; 251/54

[56] References Cited
UNITED STATES PATENTS

| | | |
|---|---|---|
| 2,099,368 | 11/1937 | Levy .......... 92/134 X |
| 2,469,038 | 5/1949 | Winkler .......... 251/54 X |
| 2,483,429 | 10/1949 | Pierce .......... 188/297 X |
| 2,633,860 | 4/1953 | Derrington .......... 251/55 X |
| 2,748,792 | 6/1956 | Davis .......... 137/155 |
| 3,102,553 | 9/1963 | Ottestad .......... 137/509 |
| 3,145,056 | 8/1964 | Blahnik .......... 251/54 X |

FOREIGN PATENTS OR APPLICATIONS

| | | |
|---|---|---|
| 119,839 | 10/1958 | U.S.S.R. .......... 137/509 |

Primary Examiner—Irwin C. Cohen
Attorney—Eric H. Waters et al.

[57] ABSTRACT

A pulse piston drive having a pulse chamber with two cavities, one accommodating a piston and the other cavity being filled with an energy medium. The cavities communicate through an opening closed by a differential valve. The closing member of the valve consists of a hollow piston positioned in the cavity for the energy medium. This piston divides the cavity into portions, one of which communicates with the inner cavity of the piston and the other accommodates a drive for forcedly closing the closing member of the valve.

1 Claim, 1 Drawing Figure

PATENTED OCT 2 1973 3,762,278
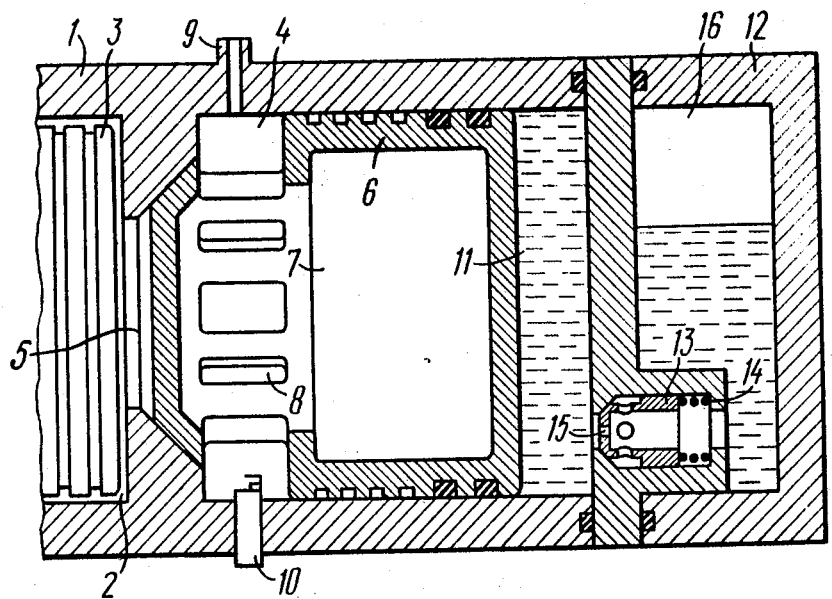

PULSE PISTON DRIVE

The present invention relates to drive mechanisms and, more particularly, the invention has reference to pulse piston drives used in machines for pressure working of metals.

This invention can be most effectively used in machines for cutting ingots in apparatus for continuous casting of steel and in machines for forging and stamping.

Well known in the art are piston pulse drives comprising a pulse chamber having a guide cavity for accommodation of a rod and a cavity filled with an energy carrier periodically communicated through an opening closed by a differential valve the closing member of which is forcedly closed by a drive.

In this case the differential closing valve comprises a closing member in the form of a rod located in a housing consisting of a guide sleeve located in the pulse chamber and hermetically joined therewith through sealing components. The drive for forcedly closing the closing member consists of a hydraulic accumulator disposed off the pulse chamber and connected to the closing valve through a pipeline transmitting the liquid pressure.

The most efficient pulse drives are used for creating a high pressure within a pulse chamber. In the known pulse drives the pressure of the energy carrier is limited due to poor reliability of the sealing devices in the places of joining the sleeve with the body of the pulse chamber. To compensate for the volume occupied by the closing valve within the cavity with the energy carrier, the dimensions of the pulse chamber must be increased. Owing to the fact that the pulse piston drives are utilized in machines for pulse cutting of ingots, the drives having large dimensions make it difficult to use such machines in multipass apparatus for continuous casting of steel having a small distance between the adjacent passes. The presence of a pipeline for transmitting the liquid pressure from the hydraulic accumulator to the closing valve leads to an increase in the hydraulic resistance of the flow of the liquid passing during the opening of the valve, thereby reducing the rate of its opening, hence increasing the energy losses of the energy carrier when it is passed to the under-piston space of the guide cavity.

An object of the present invention is to provide a pulse piston drive which allows high pressures to be created within the pulse chamber.

Another object of the invention is to provide a pulse piston drive increasing the efficiency of utilization of the energy during the passage of the energy carrier into the underpiston space of the guide cavity of the pulse chamber.

These and other objects are attained due to the fact that in a pulse piston drive having a pulse chamber to accommodate a piston and a cavity to be filled with an energy carrier periodically communicated with the guide cavity through an opening for passing the energy carrier, according to the invention, the closing member of the valve consists of a hollow piston disposed within the space containing the energy carrier with a gap allowing this piston to move during the passage of the energy carrier and characterized in that said piston divides the cavity filled with the energy carrier into portions, one of which communicates with the inner cavity of the piston through channels made in the walls of this piston, while the other portion accommodates a drive for forcedly closing the valve-piston.

Such a construction of the drive makes it possible to produce high pressures within the pulse chamber and to reduce the dimensions of the drive.

The pulse chamber is preferably provided with a hydraulic accumulator having a non-return valve with a jet, the liquid pressure of which is used for forcedly closing the valve-piston.

This provides for effective utilization of the energy carrier when it is passed into the under-piston space of the guide cavity, which is obtained due to an increase in the rate of opening of the valve due to reducing the hydraulic resistance offered to the flow of the liquid.

The present invention will be better understood from the following detailed description of the invention with reference to the accompanying drawing which shows a front sectional view of the pulse piston drive according to the invention.

The piston pulse drive comprises a pulse chamber 1 having a guide cavity 2 to accommodate a piston 3, and a cavity 4 periodically communicated with the cavity 2 through an opening 5. This opening is closed by a differential valve whose closing member consists of a hollow piston 6. This piston is disposed within the cavity 4 with a gap providing for its movement during the passage of the energy carrier disposed within a piston 6. The energy carrier may consist of a combustible mixture of gaseous or liquid fuel with an oxidizer or a compressed gas.

The piston 6 divides the cavity 4 into two portions, one of which communicates with the inner cavity 7 of the piston through channels 8 made in the piston walls. In this portion there is provided a passage 9 for feeding the energy carrier and a plug 10 for ignition of the combustible mixture. The other portion of the cavity 4 is filled with a liquid 11 being under pressure and providing for forced closing of the piston-valve. The liquid pressure is created by a hydraulic accumulator 12 mounted directly on the pulse chamber 1. The hydraulic accumulator is equipped with a non-return valve 13 loaded with a spring 14 and having a jet 15. The valve with a jet provides for forming a considerable pass section for running the liquid into the hydraulic accumulator during the opening of the valve-piston 6 and for shockless closing of the valve-piston due to the throttling of the liquid through the jet 15. The hydraulic accumulator has a cavity 16 filled by compressed gas to create a pressure.

The drive operates as follows.

The cavity 16 of the hydraulic accumulator 12 is filled with a compressed gas creating a required liquid pressure providing for closing the valve-piston 6. Supplied into the passage 9 is a combustible mixture which fills the cavity 4 and the cavity 7 intercommunicated through the channels 8. The combustible mixture is ignited by the plug 10 and is fired, thus increasing the pressure.

Under the action of this pressure the valve-piston 6 is displaced to the right, as seen in the drawing, overcoming the force exerted thereon by the liquid 11. The liquid 11 through the non-return valve 13 is displaced into the hydraulic accumulator 12, in which case the pass section of the non-return valve provides for a required running speed and consumption of the liquid at which the valve-piston 6 is opened quickly enough. During the movement of the valve-piston 6 there is opened the pass-through opening 5 which provides for filling the under-piston space of the guide cavity 2 of the pulse chamber 1 with the energy carrier under action of which the piston 3 acquires motion and energy necessary for making useful work.

After the passage of the energy carrier the pressure in the cavities 4 and 7 is reduced, and the valve-piston 6 affected by the pressure of the liquid 11 closes the opening 5. The shockless closing of the valve-piston is provided by considerably decreasing the pass section while closing the non-return valve 13, through the jet 15 of which the liquid runs into the hydraulic accummulator. The cycle is over when the piston 3 returns to its initial position.

We claim:

1. A pulse piston drive comprising, in combination: a pulse chamber having a guide cavity and a second cavity adapted to receive an energy medium, an opening communicating said guide and second cavities; reciprocable piston means being positioned in said guide cavity; a differential valve in said second cavity adapted to periodically close said opening intermediate said guide and second cavities, said valve including a closure member formed as a hollow piston having an outer peripheral wall in annularly spaced relationship with the surface of said second cavity so as to facilitate axial movement of said hollow piston during flow of said energy medium, said hollow piston dividing said second cavity into first and second portions; annular sealing means on said hollow piston outer peripheral wall maintaining said first and second portions of said second cavity in sealed relationship to each other; channel means extending through the perhipheral wall of said hollow piston facilitating flow of said energy medium into the first portion of said second cavity; means for admitting said energy medium into said first portion of said second cavity; and hydraulically actuated drive means communicating with the second portion of said second cavity for biasing said differential valve into closed position, said hydraulically actuated drive means comprising a hydraulic accumulator mounted on said pulse chamber, said accumulator including a spring-biased non-return valve having a jet nozzle forming pressurized fluid passageway means between said accumulator and the second portion of said second cavity.

* * * * *